E. B. AYRES.
DRIER.
APPLICATION FILED JAN. 15, 1913.
1,074,034.
Patented Sept. 23, 1913.
2 SHEETS—SHEET 1.
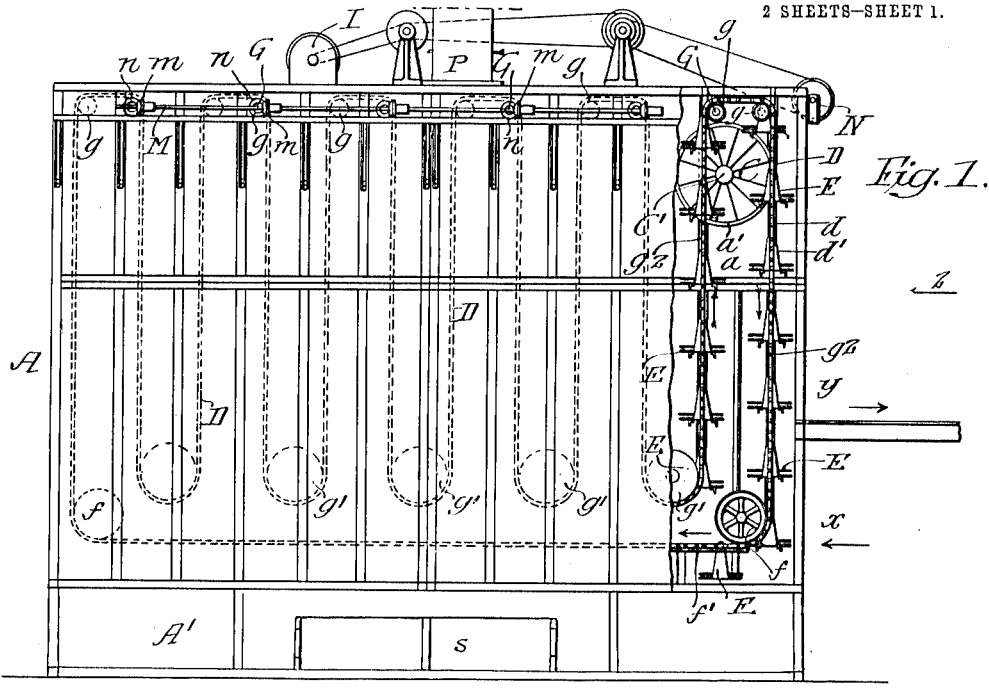
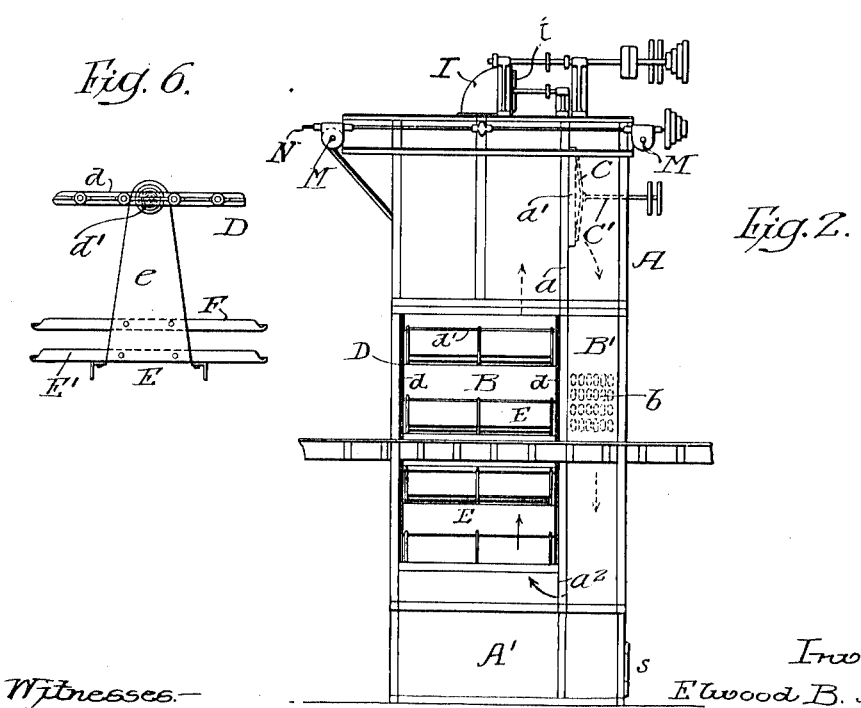
Witnesses—
Walter Thim
Willis A. Bummer
Inventor—
Elwood B. Ayres.
by his Attorneys—
Howson & Howson

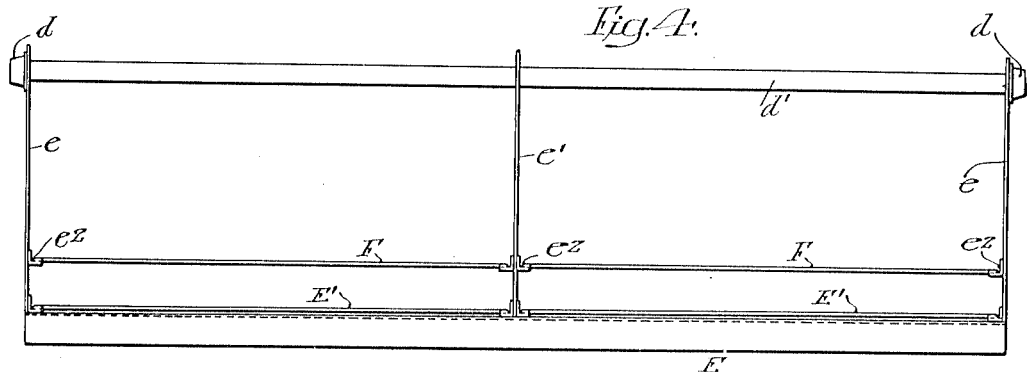
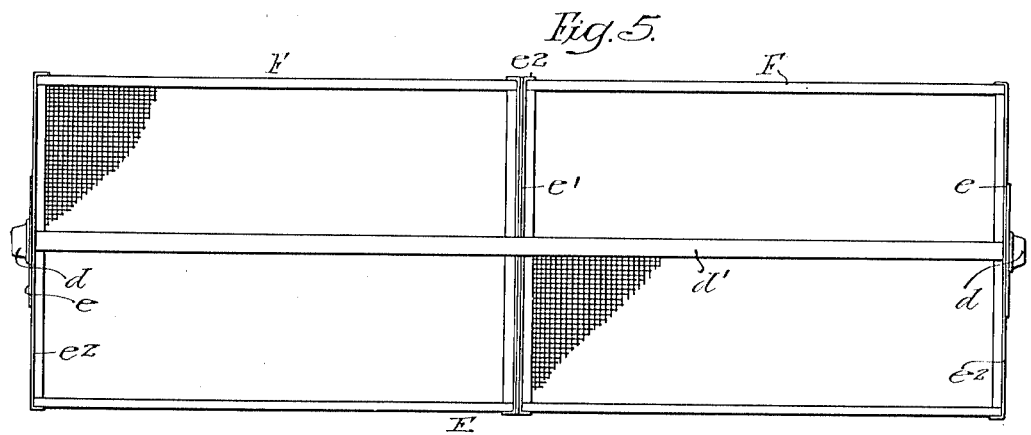
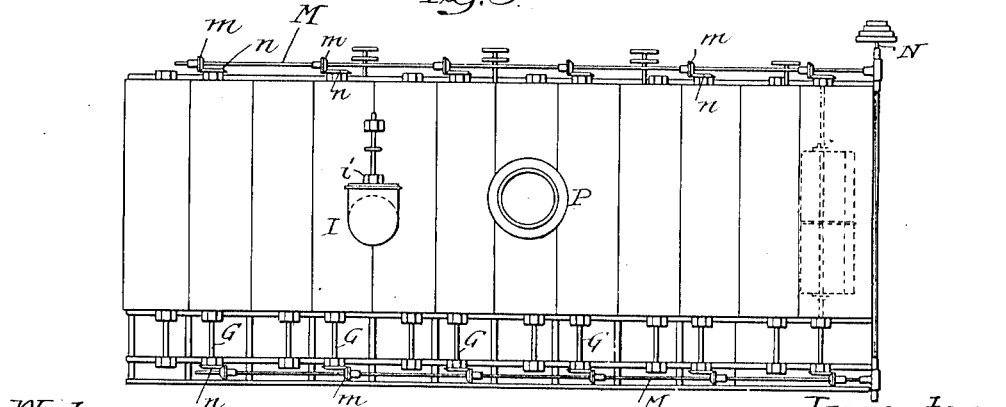

UNITED STATES PATENT OFFICE.

ELWOOD B. AYRES, OF PHILADELPHIA, PENNSYLVANIA, ASSIGNOR TO THE PHILADELPHIA TEXTILE MACHINERY COMPANY, OF PHILADELPHIA, PENNSYLVANIA, A CORPORATION OF PENNSYLVANIA.

DRIER.

1,074,034.  Specification of Letters Patent.  Patented Sept. 23, 1913.

Application filed January 15, 1913. Serial No. 742,223.

*To all whom it may concern:*

Be it known that I, ELWOOD B. AYRES, a citizen of the United States, residing in Philadelphia, Pennsylvania, have invented certain Improvements in Driers, of which the following is a specification.

The object of this invention is to provide means for continuously drying fish and other materials.

Heretofore, it has been the common practice to dry fish without mechanical circulation, usually in a room or other compartment. This method takes considerable time and the fish are not evenly dried.

By my invention the fish are dried within a drying compartment in which hot air is circulated and the trays can be properly loaded at one point, traversed through the drier, and discharged at another point.

In the accompanying drawings:—Figure 1, is a side view, partly in section, illustrating my improved drier adapted for drying fish; Fig. 2, is an end view, looking in the direction of the arrow 2, Fig. 1; Fig. 3, is a plan view; Fig. 4, is a side view of one of carriers; Fig. 5, is a plan view of one of the carriers; and Fig. 6, is an end view of one of the carriers with a portion of the conveying chain attached.

A is the casing forming a drying chamber. This casing is divided into two compartments by a vertical partition $a$ forming a drying chamber B and a heating chamber B'. In the heating chamber is a series of heating pipes $b$. These pipes can be arranged in any suitable manner without departing from the essential features of the invention.

In the upper end of the partition $a$ are openings $a'$ in which are fans C, one of which is shown in full lines, Fig. 1. These fans are mounted on shafts C' driven in any suitable manner. Near the bottom of the partition is a series of openings $a^2$ and the fans circulate the air through the drying and heating compartments.

D is a conveyer consisting of two side chains $d$, $d$ connected by bars $d'$ from which are suspended carriers E, shown clearly in Figs. 3, 4 and 5. The conveyer chains pass around guide wheels $f$ at each lower corner and around smaller guide wheels $g$ in the upper portion of the chamber B. Each loop of the conveyer passes around a guide wheel $g'$ at the lower end, and the lower horizontal run of the conveyer is adapted to rails $f'$. The vertical runs of the conveyer are also preferably guided by rails $g^2$ so as to keep the chain from swinging while in motion.

The carriers E are quadrangular in the present instance and have two trays E', E', which are detachably mounted on the frame of the carriers. The carrier consists of end plates $e$ and a center suspension plate $e'$; there are flanges at the lower edge of these plates, as shown in Fig. 3, and the trays E' rest on these flanges.

In the present instance, I have shown two sets of trays on each carrier; the trays F, F being mounted on flanges $e^2$ some distance above the lower flanges. Each of the trays is quadrangular in shape with wire gauze stretched across them, but they may be slatted or otherwise formed. Openings are provided to allow the heated air to come freely in contact with the fish.

The trays are loaded, in the present instance, at the point $x$ and the conveyer travels through the drier in the direction indicated by the arrows until it reaches the discharge point $y$, where the fish are removed from the drier.

In the top of the drying chamber B is an exhaust pipe I, in which is an exhaust fan $i$ driven as indicated in Fig. 2, so as to exhaust the moist air which accumulates in the top of the drying chamber. Fresh air may be admitted to the drying chamber at any point desired.

The shafts G, on which the sprocket wheels $g$ are mounted, are adapted to bearings at each side of the machine and have bevel wheels $n$ meshing with bevel wheels $m$ on the longitudinal shafts M which are driven from the transverse shaft N through a worm and worm gearing, as clearly shown in Figs. 1 and 3.

When it is desired to utilize the machine for smoking fish, as well as drying them, then the casing is extended and a fire box is built in the bottom, as indicated at A' in the drawings, having one or more doors $s$, and the fans are disconnected so that the only moving part is the conveyer; the smoke arising from the fire will pass up through the casing, which is provided, at its upper end, with a suitable stack P having a damper, so as to regulate the passage of the smoke. Thus the conveyer with the fish travels through the smoke, insuring an even smoking of all the fish.

While the conveyer is especially adapted for drying fish, it may be used for drying other articles, where an even and thorough drying is desired.

I claim:—

1. The combination in a drier, of a casing divided by a longitudinal partition into two compartments; heating mechanism in one compartment; an endless chain conveyer in the other compartment; guide wheels around which the chain passes, said guide wheels being so arranged that the conveyer will form a series of vertically arranged loops; and carriers pivotally suspended from the chains of the conveyer, said casing having a feeding opening and a discharge opening.

2. The combination in a drier, of a casing divided by a longitudinal partition into two compartments; heating mechanism in one compartment, the partition having openings at the upper and at the lower ends; a series of fans in the upper openings whereby the heated air is circulated through both compartments; an endless conveyer in the drying compartment consisting of two chains connected together and a series of suspended trays, the trays being pivotally connected to the chains; a series of guide wheels at the upper end of the drying chamber around which the chains pass; guide wheels at each end of the chamber around which the lower run of the chain passes; and guides for the loops of the chain; with a series of carriers suspended from the chain; and means for driving the sprocket wheels around which the upper run of the chain passes.

3. The combination in a drier, of a casing divided into two compartments by a longitudinal partition, said partition having an opening at its upper and lower ends; fans for circulating the air in the two compartments; heating mechanism in one of said compartments and conveying mechanism in the other compartment, the conveying mechanism consisting of two chains connected together; carriers pivotally suspended from the chains; guide wheels at the upper end of the casing for the chains; guide wheels at each end of the casing near the lower end for the chains; and guide wheels around which the looped portions of the chains pass, each alternate guide wheel at the upper end being secured to a driving shaft; bevel wheels on the driving shaft; two longitudinal shafts at each side of the casing; sprocket wheels on the longitudinal shafts meshing with the sprocket wheels on the transverse shafts; and a transverse driving shaft geared to the longitudinal shaft, whereby the conveyer chain is driven.

4. The combination in a drier, of a casing; an endless conveyer therein; perforated carriers mounted on the conveyer; means for circulating heated air through the conveyer; and a fire box at the bottom of the casing open to the interior of the casing so that as the smoke ascends from the fire it will smoke the fish, or other material, carried by the perforated carriers.

In testimony whereof, I have signed my name to this specification, in the presence of two subscribing witnesses.

ELWOOD B. AYRES.

Witnesses:
   Jos. H. KLEIN,
   WM. A. BARR.